(12) United States Patent
Taylor

(10) Patent No.: US 9,339,768 B2
(45) Date of Patent: May 17, 2016

(54) MULTI-CARTRIDGE MEMBRANE CONTACTORS, MODULES, SYSTEMS, AND RELATED METHODS

(71) Applicant: Celgard, LLC, Charlotte, NC (US)

(72) Inventor: Gareth P. Taylor, Indian Trail, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/465,090

(22) Filed: Aug. 21, 2014

(65) Prior Publication Data

US 2015/0053083 A1 Feb. 26, 2015

Related U.S. Application Data

(60) Provisional application No. 61/869,125, filed on Aug. 23, 2013.

(51) Int. Cl.
*B01D 63/04* (2006.01)
*B01D 19/00* (2006.01)

(52) U.S. Cl.
CPC ............ *B01D 63/04* (2013.01); *B01D 19/0031* (2013.01); *B01D 2311/13* (2013.01); *B01D 2313/19* (2013.01); *B01D 2313/32* (2013.01); *B01D 2313/44* (2013.01); *B01D 2319/025* (2013.01)

(58) Field of Classification Search
CPC .. B01D 19/0031; B01D 53/226; B01D 63/04; B01D 2311/13; B01D 2313/19; B01D 2313/32; B01D 2313/44; B01D 2317/02; B01D 2317/022; B01D 2319/025
USPC ................................................................. 96/6
See application file for complete search history.

(56) References Cited

U.S. PATENT DOCUMENTS

| | | | | |
|---|---|---|---|---|
| 4,451,369 A | * | 5/1984 | Sekino | B01D 53/226 210/321.9 |
| 6,149,817 A | | 11/2000 | Peterson et al. | |
| 2003/0111414 A1 | * | 6/2003 | Baurmeister | B01D 63/04 210/641 |
| 2006/0123753 A1 | * | 6/2006 | Sugiura | B01D 63/061 55/482 |
| 2009/0020008 A1 | * | 1/2009 | Wynn | B01D 63/12 95/45 |
| 2010/0140153 A1 | * | 6/2010 | Telepciak | B01D 61/10 210/194 |
| 2010/0230366 A1 | * | 9/2010 | Bigeonneau | B01D 19/0031 96/6 |
| 2011/0036240 A1 | * | 2/2011 | Taylor | B01D 19/0031 96/6 |
| 2014/0283683 A1 | * | 9/2014 | Oguro | B01D 53/226 95/45 |
| 2015/0048019 A1 | * | 2/2015 | Zhang | B01D 63/04 210/231.89 |

* cited by examiner

*Primary Examiner* — Jason M Greene
(74) *Attorney, Agent, or Firm* — Hammer & Associates, P.C.

(57) ABSTRACT

A multi-cartridge membrane contactor that can be used for many purposes, including, but not limited to, being a multi-cartridge degassing module. In accordance with at least particular certain embodiments, the module includes a plurality of hollow-fiber cartridges placed in a radial pattern around a central cartridge within a single larger vessel. For example, there may be two radial sets of cartridges placed in series at each of the radial positions.

13 Claims, 2 Drawing Sheets

MULTI-CARTRIDGE MEMBRANE CONTACTORS, MODULES, SYSTEMS, AND RELATED METHODS

RELATED APPLICATION

This application claims priority to and the benefit of U.S. provisional patent application Ser. No. 61/869,125 filed Aug. 23, 2013.

FIELD OF INVENTION

The instant application relates to new or improved membrane contactors, modules, cartridges, components (including housings, plates, sealing means, connectors, and/or the like), systems, their methods of manufacture and/or use, and/or means and/or methods of enhancing the robustness, operation pressures, cycle life, and the like of such membrane contactors, cartridges, components, and systems. In at least selected embodiments, the present invention is directed to new or improved mulit-cartridge membrane contactors, cartridges, components, systems, and/or their methods of manufacture and/or use, and/or means and/or methods of enhancing the robustness, operation pressures, cycle life, and the like of such membrane contactors, cartridges, components, and systems.

BACKGROUND

A membrane contactor may be used for many purposes, including but not limited to, removing entrained gases from liquids, debubbling liquids, filtering liquids, and adding a gas to a liquid. Membrane contactors are known to be used in many different applications, for example, a membrane contactor may be used in removing entrained gases from inks used in printing. Membrane contactors may also provide a means of accomplishing gas/liquid, and liquid/liquid (which can encompass liquid/dissolved solid) separations. Membrane contactors typically are used to bring two immiscible fluid phases— for example, a first liquid and a second liquid, or a gas and a liquid-into contact with one another to effect separation and/or transfer of one or more components from one fluid to the other.

A hollow fiber membrane contactor typically includes a bundle of microporous hollow fibers, and a rigid shell or housing enclosing the fiber bundle. The shell may typically be provided with four fluid ports: an inlet for introducing the first fluid, an outlet for discharging the first fluid, an inlet for introducing the second fluid, and an outlet for discharging the second fluid. The hollow fibers may be potted on both ends, within the housing, to form polymeric tube sheets with the fiber bores opening on each end into common first and second end cap portions of the shell. In a "tube-side" or "lumen-side" contactor, the first end cap may contain the inlet for the first fluid, which is designated the "tube-side" or "lumen-side" fluid because it is the fluid that passes through the internal lumens of the fibers. The second end cap contains the outlet for discharging the lumen-side fluid. The second fluid, designated the "shell-side" fluid, typically enters and exits the housing through inlet and outlet ports arranged between the tube sheets, whereby the shell-side fluid contacts the external surfaces of the fibers. The shell-side fluid flows through the interstices between fibers of the fiber bundle, and may be directed to flow parallel or perpendicular to the fiber length. As an example, U.S. Pat. No. 5,352,361 to Prasad, et al., incorporated by reference herein in its entirety, may assist in a background understanding of fluid contact across hollow fiber membranes within a shell or housing.

In a "shell-side" contactor, the contactor may include a central core which passes through the end caps and has a first end serving as the inlet for the first fluid, which is designated the "shell-side" fluid because it is the fluid that passes over the exterior or shell of the hollow fibers. The first end cap may contain the inlet for the second fluid, which is designated the "tube-side" or "lumen-side" fluid because it is the fluid that passes through the internal lumens of the fibers. The second end cap contains the outlet for discharging the lumen-side fluid. The first fluid, designated the "shell-side" fluid, typically enters and exits the housing through inlet and outlet ports (open ends) of the perforated core, and typically exits and re-enters the perforations in the core between the tube sheets whereby the shell-side fluid contacts the external surfaces of the fibers. The shell-side fluid flows through the interstices between fibers of the fiber bundle, and may be directed to flow parallel or perpendicular to the fiber length.

Because the tube sheets separate the lumen-side fluid from the shell-side fluid, the lumen-side fluid does not mix with the shell-side fluid, and the only transfer between the lumen-side fluid and the shell-side fluid occurs through the walls of the hollow fibers. The fine pores in the fiber wall are normally filled with a stationary layer of one of the two fluids, the other fluid being excluded from the pores due to surface tension and/or pressure differential effects. Mass transfer and separation are usually caused by diffusion, which is driven by the difference in concentration of the transferring species between the two phases. Typically, no convective or bulk flow occurs across the membrane.

In the case of gas/liquid separations, membrane contactors are typically fabricated with hydrophobic hollow fiber microporous membranes. Since the membranes are hydrophobic and have very small pores, liquid will not easily pass through the pores. The membranes act as an inert support that brings the liquid and gas phases into direct contact, without dispersion. The mass transfer between the two phases is governed by the difference in partial pressure of the gas species being transferred.

For liquid systems, the liquid/liquid interface at each pore is typically immobilized by the appropriate selection of membrane and liquid phase pressures. In this case, the membrane also acts as an inert support to facilitate direct contacting of two immiscible phases without mixing.

Such known membrane contactors can be utilized for a variety of applications, including the separation of a component from a fluid or transferring a component of one fluid to another. For example, a membrane contactor can be used in removal of contaminants from an effluent stream. In many industrial processes, a contaminated effluent stream is generated as a by-product. In view of environmental concerns, and/or efforts to improve process efficiency, it is often desirable to remove one or more contaminants from the effluent stream so that the contaminant does not pollute the environment, negatively affect equipment, or so that it may be recycled. Existing industrial processes frequently must be upgraded to reduce environmental emissions and/or increase efficiency. Therefore, a need often arises for a process and system that can be economically retrofit to an existing plant to reduce emissions, protect equipment, recycle, or improve efficiency.

Several factors are important in the design of membrane contactors, including separation characteristics, cost, pressure drop, weight, and efficiency. The pressure drop across a contactor should be low to reduce the need for more expensive high pressure equipment. Low pressure drop is of particular importance in retrofit projects where a membrane contactor is to be added at the discharge point of an effluent process stream, as the process pressure at this point is typically at or near atmospheric pressure. High efficiency of mass transfer is desirable for reducing the size of the contactor. Low weight is desirable for decreasing installation and maintenance costs, and is of particular importance in offshore applications.

Shell-less membrane contactors capable of separating fluids are known, for example, see U.S. Pat. No. 6,149,817, which is incorporated herein by reference in its entirety. At least certain of such contactors may include a perforated center tube, a plurality of hollow fibers surrounding the tube, tube sheets affixing the ends of the hollow fibers, and end caps at one or both ends. The fibers are open to at least one of the end caps which include a port for communicating with the lumen side of the fibers. The U.S. Pat. No. 6,149,817 discloses that a plurality of shell-less membrane contactors may be provided in an assembly with at least two stages with support bases between each stage that serve as barriers to fluid passage between stages. The assembly includes collection and transfer means and inlet and outlet manifolds for each shell-less membrane contactor.

High pressure membrane contactors with multiple cartridges are known, for example, see U.S. Patent Publication No. 2011/0036240, which is incorporated herein by reference in its entirety. At least certain of such cartridges may include a perforated center tube, a plurality of hollow fibers surrounding the tube, and tube sheets affixing the ends of the hollow fibers. The 2011/0036240 publication discloses that two of the cartridges may be housed in a single cartridge where the cartridges are connected together in series by a hollow connector.

However, there is always a need to develop new or improved contactors, modules and/or systems that provide unique configurations resulting in distinctive performance characteristics, for certain applications, for certain conditions, or the like. For example, the inventors have discovered that in certain embodiments the gas being swept through the lumens can lose its driving force before reaching the end of the lumen length as oxygen is absorbed into the sweep stream. Thus, new or improved contactors, modules and/or systems are needed.

SUMMARY OF THE INVENTION

In accordance with at least selected embodiments, the instant invention addresses the above mentioned problem and provides a multi-cartridge membrane contactor that can be used for many purposes, including, but not limited to, being a multi-cartridge degassing module, as described in the text and claims below and the accompanying drawing.

In accordance with at least certain embodiments, aspects or objects, the instant invention provides or is directed to a multi-cartridge membrane contactor that can be used for many purposes, including, but not limited to, being a multi-cartridge degassing module. In accordance with at least particular certain embodiments, the invention includes a plurality of hollow-fiber cartridges placed in a radial pattern around a central cartridge within a single larger vessel. For example, in the exemplary embodiment shown in FIG. 1, there are two radial sets of cartridges placed in series at each of the radial positions. However, the invention is not limited to just two radial sets, as a single set of cartridges placed in series could be used as well as three or more radial sets of cartridges placed in series at each of the radial positions. As shown in FIG. 1, the cartridges may be preferably aligned by means of three plates with holes drilled in a radial pattern to receive the cartridges. The large vessel may have a plate at each end and a third plate at the center. The cartridges may seal to these plates by any sealing means, including, but not limited to o-rings, gaskets, or other similar sealing mechanisms. The center plate may also function as a connector to join the cartridge pairs in series. The plates may be sealed to the large housing or vessel by any sealing means, including, but not limited to, a gasket, o-ring, welding, pressure, or other types or methods.

In accordance with at least selected certain embodiments, the cartridges may be potted at each end and have a perforated center tube. One end of the center tube may be closed, and the other end may be open. The outside of the cartridges can be open in certain embodiments (i.e. no housing or shell, shell-less) or have a perforated housing or shell to allow water to flow freely there through in other embodiments. The open end of the center tube may use a spool piece that may allow the first cartridge center tube to seal in series to the center tube of the second cartridge (similar to the hollow connector of the 2011/0036240 publication).

In accordance with at least selected embodiments, the flow path may be un the inlet, over the outside of the cartridge bundle, radially in through the bundle to the center tube, through the spool piece into the center tube of the next cartridge, radially out through the bundle of the second cartridge, and out of the outlet. In certain selected embodiments, the flow from the first cartridge in series to the second may be separated outside the cartridges by the central plate. This feature may force all the flow through the bundles without bypassing the membranes (radial shell side flow). As such, in certain embodiments, all of the cartridges in the radial pattern may perform in the same manner.

In a possibly preferred embodiment, a multi-cartridge membrane contactor may have at least two longitudinal sections. Each longitudinal section has at least two membrane cartridges. The number of cartridges in each section is the same. Each section is removably attachable to the other section. One cartridge in one section is connectable to another cartridge in the other section, thereby defining a continuous channel through all sections.

DETAILED DESCRIPTION OF THE INVENTION

As one example, the multi-cartridge membrane contactor of the instant invention may be used as a multi-cartridge degassing module. In this embodiment, as shown, for example, in FIG. 1, a gas sweep and/or vacuum may be achieved on the lumen side of the membrane in a conventional way with the fibers open on each end of the cartridges. The lumen fibers of the first cartridge in series may communicate to the lumen fibers of the second cartridge due to the seal between the spool piece and the central plate. This provides a zone that may act as a gas equalizing gap by mixing the gas flow from the lumens of the first cartridge before entering the second cartridge. This step may be advantageous because oxygen which may be absorbed in the sweep stream may lose its driving force before reaching the end of the lumen length.

Figure 1:
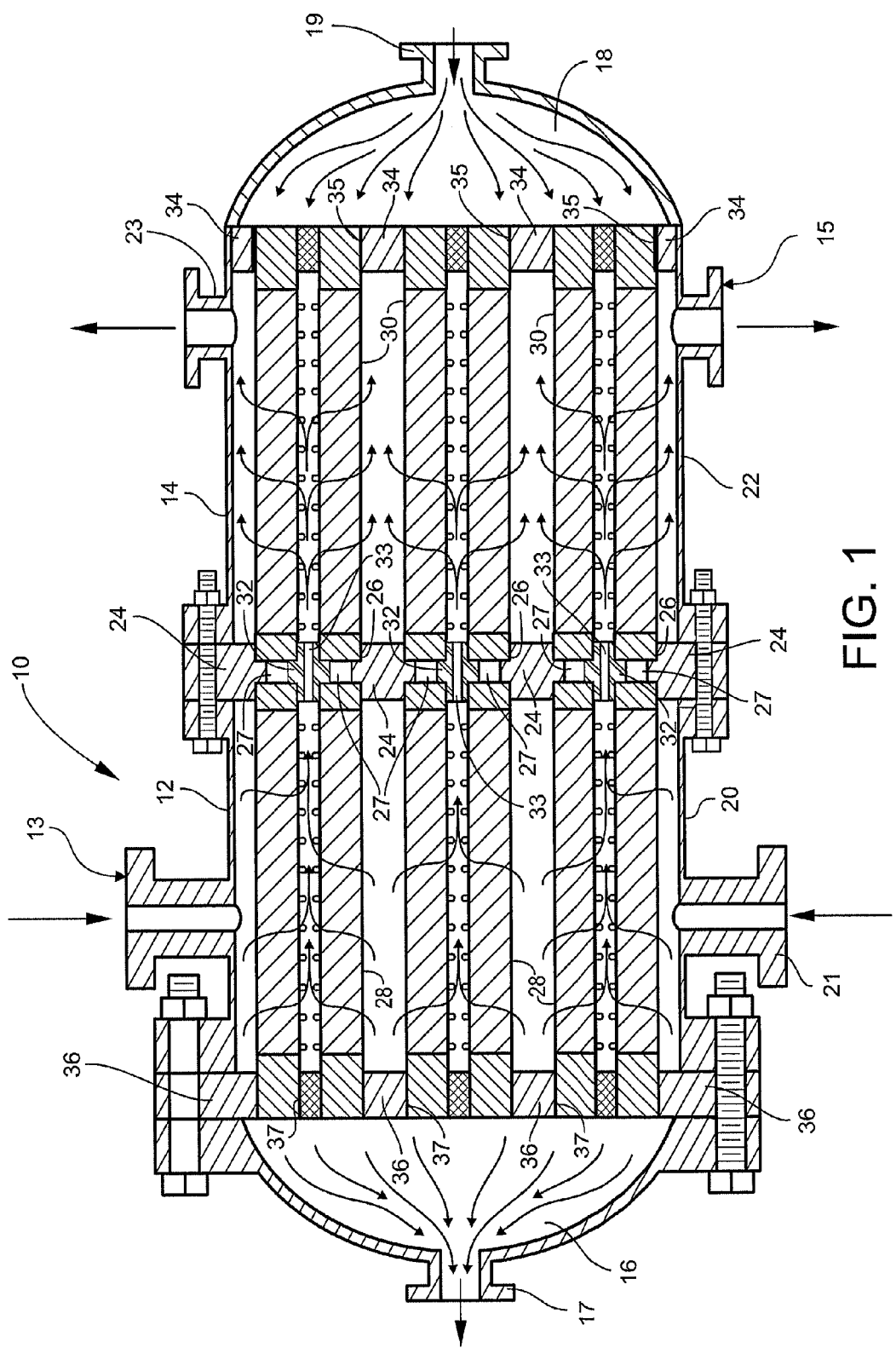
FIG. 1 is a schematic view of a longitudinal section of one embodiment of the contactor according to the current invention.

Referring to FIG. 1, there is shown an exemplary multi-cartridge membrane contactor 10 according to at least one embodiment of the invention.

Contactor 10, as shown, but not so limited, generally comprises at least two longitudinal sections 12/14, and head spaces 16/18 at the ends of sections 12/14. Sections 12/14 are detachably fastened together (gas and liquid tight) in any conventional manner, for example, via bolted flange. Sections 12/14 may have side ports 13/15. Section 12 is shown in FIG. 1 with a fluid inlet 21 and section 14 is shown in FIG. 1 with a fluid outlet 23. Head spaces 16/18 are fastened together (gas and liquid tight), detachably or fixedly, to the ends of the longitudinal sections 12/14 in any conventional manner, for example, via bolted flange or welding or gluing. Any number of sections maybe joined together, 2, 3, 4, 5, or more. Head spaces 16/18 include end ports 17/19. On head space 16, the port 17 is shown as a fluid outlet 17, and on head space 18, the port 19 is shown as a fluid inlet. Depending on the desired flow path, each port 13, 15, 17, or 19 may be an inlet or an outlet and may be operatively connected in series or parallel to another contactor or device. An end plate 36 is located between head space 16 and section 12, and an end plate 34 is located between head space 18 and section 14. A central plate 24 is located between sections 12, 14. Each section 12/14 includes a plurality of cartridges 28 (in section 12) and 30 (in section 14), the cartridges will be discussed in greater detail below. The number of cartridges in each section is not limited, but typically, there will be at least 2 and there may be as many as 10. The number of cartridges in each section should be the same, so that the longitudinal axis of a cartridge in one section aligns with the longitudinal axis of a mating cartridge in the next section (as shown).

End plates 34/36 may be provided with nesting positions 35/37 respectively for holding the ends of the cartridges. The nesting positions may be configured in any manner, so long as the end of the cartridge is held in a sealed (gas and liquid tight) manner against the end plate and a major portion of the terminal end of the cartridge is in fluid communication with the head space. These nesting positions hold the ends of the cartridges in sealed (gas and liquid tight) manner (for example, an O-ring may be used to effect the seal). Additionally, the nesting positions should be sufficiently large to allow a major portion of the terminal ends of the cartridges to be in fluid communication with their respective head spaces 16/18. The number of nesting positions should correspond to the number of cartridges in the section. As an example, in FIG. 1, the nesting positions are shown as holes through the end plates.

Central plate 24 is positioned between each section (but not between a section and its head space. As shown in FIG. 1, there is only one central plate, but if more than two sections are joined together, there will be a central plate between each of those sections. Central plate 24 may be provided with nesting positions 26 for holding the end of the cartridge. The nesting positions may be configured in any manner, so long as the end of the cartridge is held in a sealed (gas and liquid tight) manner against the central plate and a major portion of the terminal end of the cartridge is in fluid communication with a mating cartridge in the adjoining section. These nesting position hold the ends of the cartridge in sealed (gas and liquid tight) manner (for example, an O-ring may be used to effect the seal). Additionally, the nesting positions should be sufficiently large to allow a major portion of the terminal ends of the cartridges to be in fluid communication with their mating cartridge in the adjoining section. The number of nesting positions should correspond to the number of cartridges in the section. As an example, in FIG. 1, the nesting positions 26 are shown as holes through the central plate.

A zone 27 may be provided within in the nesting position 26 of the central plate 24. This zone acts as an equalization gap between cartridges 28/30. The zone allows fluid traveling through the hollow fibers of the cartridges to pass from one cartridge to the next.

A spool member 32 may be provided between cartridges 28/30. The spool member interconnects the perforated center tube of the cartridges in each section, so that fluid may freely pass between the sections. Spool member 32 may include a stop (shown as a raised annular ring at the center of the central portion of the spool member in FIG. 1), so that when the cartridges are fit into the nesting positions of the central plate, space of the zone 27 may be provided. Spool member 32 may also include an axial hole 33 therethrough, thereby effecting fluid communication between the perforated center tubes of the cartridges of the respective sections.

Figure 2:
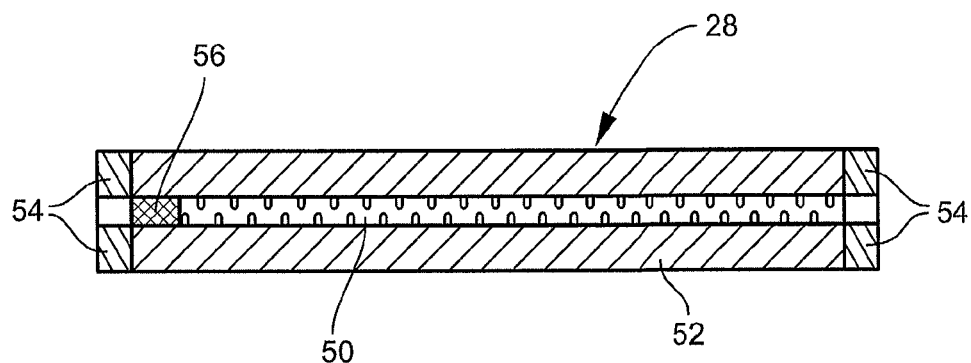
FIG. 2 is a schematic view of a longitudinal section of one embodiment of a cartridge according to the current invention.
Figure 3:
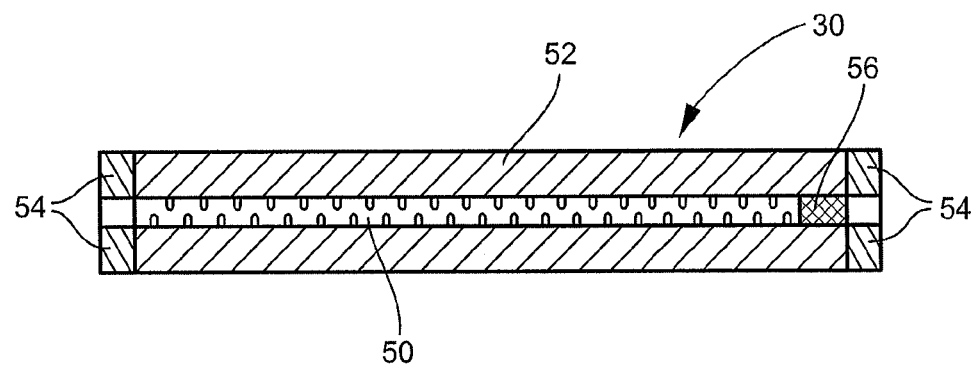
FIG. 3 is a schematic view of a longitudinal section of another embodiment of a cartridge according to the current invention.
Figure 4:
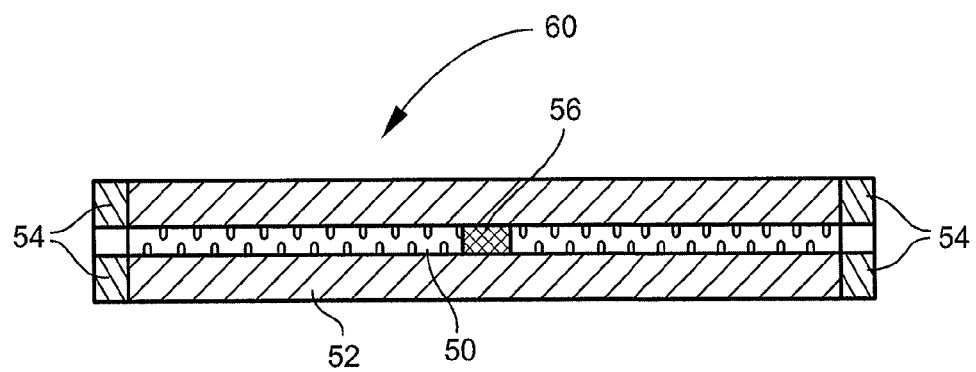
FIG. 4 is a schematic view of a longitudinal section of another embodiment of a cartridge according to the current invention.

Referring to FIGS. 2-4, various exemplary cartridges are illustrated. The cartridges are hollow fiber membrane cartridges. These hollow fiber membrane cartridges generally comprise: a perforated center tube 50, a plurality of hollow fiber membranes, and tube sheets 54 at both ends of the cartridge. The hollow fiber membrane may be any hollow fiber membrane, for example, CELGARD® hollow fibers commercially available from Celgard, LLC of Charlotte, N.C. The fibers are formed into an array (e.g., a flat mat where the individual fibers are held in parallel alignment with threads), and then the array is wound around the center tube 50 so that the longitudinal axis of the tube is parallel with the longitudinal axis of the fibers. The tube sheets may be formed as the array is wound around the center tube, as is well known. After completion of winding and solidification of the tube sheets, a terminal portion of the tube sheets are removed to ensure that the terminal ends of the hollow fibers are open for free fluid communication, as is well known. FIG. 2 shows cartridge 28 of section 12. Cartridge 28 includes a block 56 at the left end of and within center tube 50. This block prevents the flow of fluid from this end of the center tube. Referring to FIG. 1, the block is positioned adjacent end plate 36. FIG. 3 shows cartridge 30 of section 14. Cartridge 30 includes a block 56 at the right end of and within center tube 50. This block prevents the flow of fluid from this end of the center tube. Referring to FIG. 1, the block is positioned adjacent end plate 34. FIG. 4 shows a cartridge 60 that may be used if more than two sections are used (not shown in FIG. 1) or may be used in place of cartridges 28 and 30 if a block 56 is added at one end. In this cartridge 60, the block 56 is shown at the midpoint between tube sheets 54, however, the block may be placed at any position between the tube sheets 54 and is not limited to the midpoint (alternatively, there may be no block in this cartridge). Additionally, the cartridges may include one or more baffles, as is well known. For example, a baffle may be added at block 56 in cartridge 60.

In operation, contactor 10 may be expanded (lengthened) or collapsed (shortened) by removal of sections and central plates. Once configured to the desired length, a first fluid (for example a gas) is flowed through contactor 10 by, for example, introducing that fluid to inlet 19 where it enters head space 18. This fluid then enters the lumens of the hollow fibers and passed through the length of the hollow fibers, passes through the zone 27 and then on through the length of the lumens of the next cartridge. Finally, the fluid exits the contactor 10 by passing from the hollow fibers of the last cartridge into the head space 16 and out via outlet 17. As the first fluid passes through the length of the contactor, it may pick-up or deposit a component from or into the other fluid (this operation is governed by diffusion). The first fluid's travel path is typically referred as the lumen (or tube) side. Simultaneously with the passage of the first fluid, a second fluid enters one of the sections 12/14 via inlet 21 and passes over the exterior surface of the hollow fibers and into the perforated center tubes of the cartridges, the second fluid passes into the perforated center and is directed through the spool member into the next cartridge, In the next cartridge, the second fluid leaves the perforated center tube, passes over the exterior surface of the hollow fibers, and exits the section via outlet 23. As the second fluid passes through the contactor, it may pick-up or deposit a component from or into the first fluid (this operation is governed by diffusion). The second fluid's travel path is typically referred as the shell side. The first and second fluids may be flowed through the contactor in either a concurrent or countercurrent fashion. The fluids may be either a gas or a liquid. In one possibly preferred embodiment, the first fluid is a gas, sweep gas, or vacuum, and the second fluid is a liquid to degassed, debubbled, or gasified.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

The invention claimed is:

1. A multi-cartridge membrane contactor comprising:
at least two longitudinal sections, each longitudinal section having at least two hollow fiber membrane cartridges, the number of cartridges in each section being the same, each section being removably attachable to an adjacent section, a plate between said sections with a nesting position for holding an end of each cartridge therein, and one cartridge in each section being connectable to another cartridge in the adjacent section, thereby defining a continuous channel through all sections.

2. The multi-cartridge membrane contactor of claim 1 further comprising a head space at a distal end of the section.

3. The multi-cartridge membrane contactor of claim 2 further comprising a plate between said section and said head space.

4. The multi-cartridge membrane contactor of claim 1 wherein a connector connects one cartridge of one section with one cartridge of the adjacent section.

5. The multi-cartridge membrane contactor of claim 4 further wherein said connector has an axial channel therethrough.

6. The multi-cartridge membrane contactor of claim 1 wherein a mixing chambers are located between the cartridges of one section and the cartridges of the adajacent section.

7. A multi-cartridge membrane contactor comprising:
at least two longitudinal sections, each longitudinal section having at least two hollow fiber membrane cartridges, the number of cartridges in each section being the same, each section being removably attachable to an adjacent section, a plate between said sections, and one cartridge in each section being connectable to another cartridge in the adjacent section, thereby defining a continuous channel through all sections.

8. The multi-cartridge membrane contactor of claim 7 wherein the plate between said sections includes a nesting position for holding an end of each cartridge therein.

9. The multi-cartridge membrane contactor of claim 7 further comprising a head space at a distal end of the sections.

10. The multi-cartridge membrane contactor of claim 9 further comprising a plate between said section and said head space.

11. The multi-cartridge membrane contactor of claim 7 wherein a connector connects one cartridge of one section with one cartridge of the adjacent section.

12. The multi-cartridge membrane contactor of claim 11 further wherein said connector has an axial channel therethrough.

13. The multi-cartridge membrane contactor of claim 7 wherein mixing chambers are located between the cartridges of one section and the cartridges of the adjacent section.

* * * * *